(12) United States Patent
Shannon

(10) Patent No.: US 11,084,516 B2
(45) Date of Patent: Aug. 10, 2021

(54) HYDRAULIC HELM PUMP WITH INTEGRATED ELECTRIC PUMP

(71) Applicant: CANADA METAL (PACIFIC) LTD., Delta (CA)

(72) Inventor: David Thomas Shannon, West Vancouver (CA)

(*) Notice: Subject to any disclaimer, the term of this patent is extended or adjusted under 35 U.S.C. 154(b) by 215 days.

(21) Appl. No.: 16/335,696

(22) PCT Filed: Sep. 22, 2016

(86) PCT No.: PCT/IB2016/055656
§ 371 (c)(1),
(2) Date: Mar. 22, 2019

(87) PCT Pub. No.: WO2018/055436
PCT Pub. Date: Mar. 29, 2018

(65) Prior Publication Data
US 2020/0180745 A1    Jun. 11, 2020

(51) Int. Cl.
| | |
|---|---|
| *B62D 1/00* | (2006.01) |
| *F04B 17/03* | (2006.01) |
| *F04B 49/22* | (2006.01) |
| *B63H 25/04* | (2006.01) |
| *B63H 20/12* | (2006.01) |
| *B63H 25/12* | (2006.01) |
| *B63H 25/02* | (2006.01) |
| *F04B 9/02* | (2006.01) |

(52) U.S. Cl.
CPC .............. *B62D 1/00* (2013.01); *B63H 20/12* (2013.01); *B63H 25/04* (2013.01); *B63H 25/12* (2013.01); *F04B 17/03* (2013.01); *F04B 49/225* (2013.01); *B63H 25/02* (2013.01); *F04B 9/02* (2013.01)

(58) Field of Classification Search
CPC . B63H 25/02; B63H 25/12; F04B 9/02; F04B 17/03; F04B 49/225
See application file for complete search history.

(56) References Cited

U.S. PATENT DOCUMENTS 4,700,794 A * 10/1987 Bernhagen ........... B62D 11/183
    180/6.44
4,933,617 A    6/1990 Huber et al.
(Continued)

OTHER PUBLICATIONS

ISA/CA, International Search Report and Written Opinion issued in corresponding PCT Application No. PCT/IB2016/055656, dated Jun. 16, 2017, 6 pages.

*Primary Examiner* — Patrick Hamo
(74) *Attorney, Agent, or Firm* — Wood Herron & Evans LLP

(57) ABSTRACT

A steering assembly for a hydraulic steering system is disclosed. The steering assembly includes a steering input device and an auxiliary drive assembly. The auxiliary drive assembly includes a lock valve body with one or more fluid passages that facilitates regulation of a fluid flow in response to an input from the steering input device. The lock valve body has a surface and a guide bore. Further, an electric pump is included that has an electric motor with a drive train unit. The electric pump is adapted to be mounted to the surface and the drive train unit is adapted to be positioned through the guide bore and operably coupled to the one or more fluid passages to regulate the fluid flow in the one or more fluid passages.

20 Claims, 10 Drawing Sheets

(56) References Cited

U.S. PATENT DOCUMENTS

| | | | | |
|---|---|---|---|---|
| 5,228,405 A * | 7/1993 | Merten | ............... | B63H 25/30 |
| | | | | 114/150 |
| 5,340,341 A * | 8/1994 | Yoshimura | ........... | B63H 21/265 |
| | | | | 114/150 |
| 5,357,889 A * | 10/1994 | Wood | ............... | B63H 25/04 |
| | | | | 114/144 E |
| 5,427,555 A * | 6/1995 | Merten | ............... | B63H 21/265 |
| | | | | 114/154 |
| 5,605,109 A * | 2/1997 | Merten | ............... | B63H 25/30 |
| | | | | 114/150 |
| 5,632,217 A | 5/1997 | Ford et al. | | |
| 5,775,102 A * | 7/1998 | Frye | ............... | B62D 5/065 |
| | | | | 60/431 |
| 5,928,041 A * | 7/1999 | Anderson | ............... | F15B 9/12 |
| | | | | 440/61 R |
| 6,598,553 B1 * | 7/2003 | Hundertmark | ......... | B63H 25/22 |
| | | | | 114/150 |
| 6,715,438 B1 * | 4/2004 | Hundertmark | ......... | B63H 20/12 |
| | | | | 114/144 R |
| 6,799,528 B1 | 10/2004 | Bekker | | |
| 7,097,520 B2 | 8/2006 | Okumura et al. | | |
| 9,669,914 B1 * | 6/2017 | Hundertmark | ......... | B63H 20/12 |
| 2003/0033969 A1 * | 2/2003 | Doetsch | ............... | B63H 25/24 |
| | | | | 114/150 |
| 2012/0214369 A1 * | 8/2012 | Knaack | ............... | B63H 25/42 |
| | | | | 440/61 S |
| 2017/0283026 A1 * | 10/2017 | Gai | ............... | B62D 5/0409 |
| 2019/0118922 A1 * | 4/2019 | McGinley | ............ | B63H 25/14 |
| 2020/0198749 A1 * | 6/2020 | Boyes | ............... | B63H 25/14 |

* cited by examiner

SECTION 9-9

HYDRAULIC HELM PUMP WITH INTEGRATED ELECTRIC PUMP

TECHNICAL FIELD

The present disclosure relates to a steering assembly in hydraulic steering systems in watercrafts, and, more particularly, to helm pumps that are integrated with an electric pump that is configured to drive the watercraft in an auto-mode or a power assist mode.

BACKGROUND

Manual hydraulic steering systems in watercrafts conventionally use a manual steering pump, such as an axial piston pump (also referred to as helm pumps), to power the watercraft's steering operation. Such systems generally include a steering input device and a rudder, with the manual steering pump typically operatively arranged between the steering input device and an actuator. The actuator, in general, embodies a steering cylinder, and is typically arranged between the manual steering pump and the rudder. The actuator is adapted to transfer a motion developed by the steering pump, in response to an input from the steering input device, to the rudder. For example, a movement (or rotation) of the steering input device, such as by manual or other powered means, enables a rotation of the steering pump, in turn facilitating the rudder's movement and the watercraft's steering operation.

In further detail, a transmission of motion between the steering input device and the steering pump is commonly imparted mechanically, such as by a power transmission shaft, as is conventionally known. A subsequent transmission of a motion from the steering pump to the rudder is mostly imparted by fluid pressure and flow. In general, fluid pressure may be built-up by the rotation of the steering pump, and once the fluid pressure is appropriately built-up, the fluid pressure (or flow) is translated to the steering cylinder for an actuation of the steering cylinder. Since the rudder is connected to the steering cylinder, an actuation executed by the steering cylinder (owing to a resulting pressure differential developed by increasing the fluid pressure in the steering pump) is translated to a motion of the rudder. A rudder motion facilitates the watercraft's steering, as aforementioned.

When adding an autopilot to a watercraft equipped with a conventional manual hydraulic steering system, an electric reversing pump is required to be integrated into the conventional manual hydraulic steering system. However, electric pumps need to be positioned suitably within the watercraft's hood or hull to comply with spatial constraints of the watercraft. Additionally, installation of electric pumps requires multiple hydraulic plumb lines and associated hydraulic fittings, which may increase cost and bulk of the hydraulic steering system. In general, it is also required to purge all of the additional plumb lines and fittings of air after initial assembly, and also after any service or repairs. This involves labor, time, and associated costs.

U.S. Pat. No. 5,357,889 (889 reference) to Robert A. R. Wood relates to an autopilot actuator in a watercraft. The '889 reference discloses an arrangement between a wheel shaft extension and a pusher shaft that causes the wheel shaft extension to turn in response to a system of gears activated by an electric motor. A turning of the wheel shaft extension activates a gear system within an associated rotary helm unit that moves the watercraft's rudder. The '889 reference works without hydraulic power, and, therefore, the '889 reference is silent on the use of electric hydraulic pumps.

SUMMARY OF THE INVENTION

One aspect of the present disclosure discusses a steering assembly for a hydraulic steering system. The steering assembly includes a steering input device and an auxiliary drive assembly. The auxiliary drive assembly includes a lock valve body and an electric pump. The lock valve body includes one or more fluid passages that facilitate regulation of a fluid flow in response to an input from the steering input device. The lock valve body includes a surface and a guide bore. The electric pump includes an electric motor with a drive train unit. The electric motor is configured to be mounted to the surface and the drive train unit is configured to be positioned through the guide bore and be coupled to the fluid passages to selectively regulate the fluid flow in the one or more fluid passages.

Certain aspects of the present disclosure disclose an auxiliary drive assembly for a hydraulic steering system. The auxiliary drive assembly includes a lock valve body with a recess and a guide bore. The lock valve body includes at least two input ports to alternatively receive fluid as input, at least two delivery ports to alternatively deliver fluid as output, a fluid passage defined between the at least two delivery ports, and a first spool valve configured to regulate a fluid flow from the at least two input ports to the at least two delivery ports. Further, an electric pump is included. The electric pump includes an electric motor with a drive train unit. The electric motor is configured to be received into the recess and the drive train unit is configured to be positioned through the guide bore and be coupled to the fluid passage to regulate the fluid flow between each of the at least two delivery ports.

In another aspect of the present disclosure a watercraft is disclosed. The watercraft includes a steering assembly with a steering input device and a helm pump. The helm pump is configured to be actuated by an input of the steering input device. Further, the hydraulic steering system includes an auxiliary drive assembly. The auxiliary drive assembly includes a lock valve body and an electric pump. The lock valve body is fluidly coupled to the helm pump and includes one or more fluid passages that facilitate regulation of a fluid flow in response to the input from the steering input device. The lock valve body includes a surface and a guide bore. The electric pump includes an electric motor with a drive train unit. The electric motor is configured to be mounted to the surface and the drive train unit is configured to be positioned through the guide bore and be coupled to the fluid passages, so as to selectively regulate the fluid flow in the one or more fluid passages.

DETAILED DESCRIPTION

Figure 1:
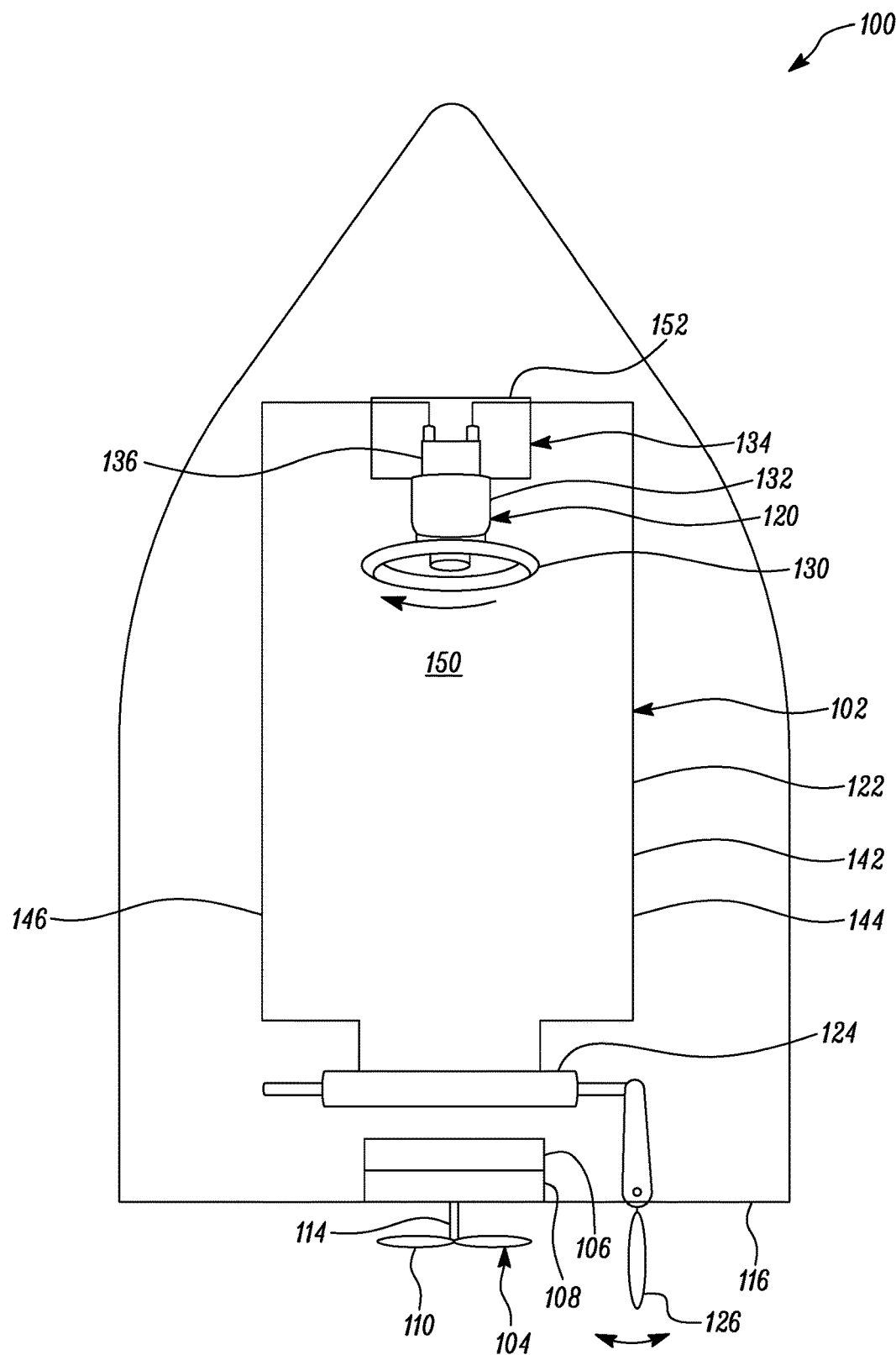
FIG. 1 is a schematic view of a watercraft installed with a marine propulsion system and hydraulic steering system, in accordance with an embodiment of the present disclosure.

Reference will now be made in detail to preferred embodiments of aspects of the present disclosure, an example of which is illustrated in the accompanying drawings. Wherever possible, the same reference numerals will be used throughout the drawings and description to refer to the same or like parts.

Referring to FIG. 1, there is shown an exemplary watercraft 100. The watercraft 100 includes a steering system 102 and a marine propulsion system 104. As part of the marine propulsion system 104, the watercraft 100 includes an engine 106, a power transmission unit (referred to as a pod 108), and a propeller 110.

The engine 106 may be one of the commonly available power generation units of the art, such as embodying conventional internal combustion engines. In an embodiment, the engine 106 may embody a diesel engine or a petrol engine, although various other engine types are possible. The engine 106 may be located in an engine compartment (not shown) of the watercraft 100. The engine 106 may embody an inline or a V-configuration, although other configurations are possible. The engine 106 may be connected to the pod 108, which is inclusive of generally a complex arrangement of gearings, known power transmission units, and associated features, through a driveshaft (not shown). The connection between the engine 106 and the pod 108 may represent a first part connection. A second part connection may be represented by a connection between the pod 108 and the propeller 110. The second part connection may be enabled through an auxiliary driveshaft 114. Perhaps, a direct connection may exist between the pod 108 and the propeller 110 and may be known, understood, and applied, by those of skill in the art. The second part connection may be external of a transom 116 of the watercraft 100 and may be driven by the pod 108 to power the propeller 110, facilitating watercraft propulsion. Effectively, the engine 106, the pod 108, and the steering system 102, may work in concert to facilitate watercraft navigation in water. Although the configuration described, it may be noted that aspects of the present disclosure is not limited to the present disclosure alone, and varied environments, such as involving 'all electric outboard motors', may also use one or more of the disclosed aspects.

The steering system 102 is a hydraulic steering system. The steering system 102 is configured to steer and direct a motion of the watercraft 100 in water, such as when the marine propulsion system 104 is in operation. The steering system 102 includes a steering assembly 120, a steering circuit 122 of the steering assembly 120, a steering cylinder 124, and a rudder 126. The steering assembly 120 is comprised of a steering input device 130, a manual or a helm pump 132, and an auxiliary drive assembly 134 (best shown and envisioned in FIG. 6). The auxiliary drive assembly 134 in turn includes a lock valve body 136 and an electric pump 138 (see FIG. 2, each of which will be discussed in detail later).

Figure 3:
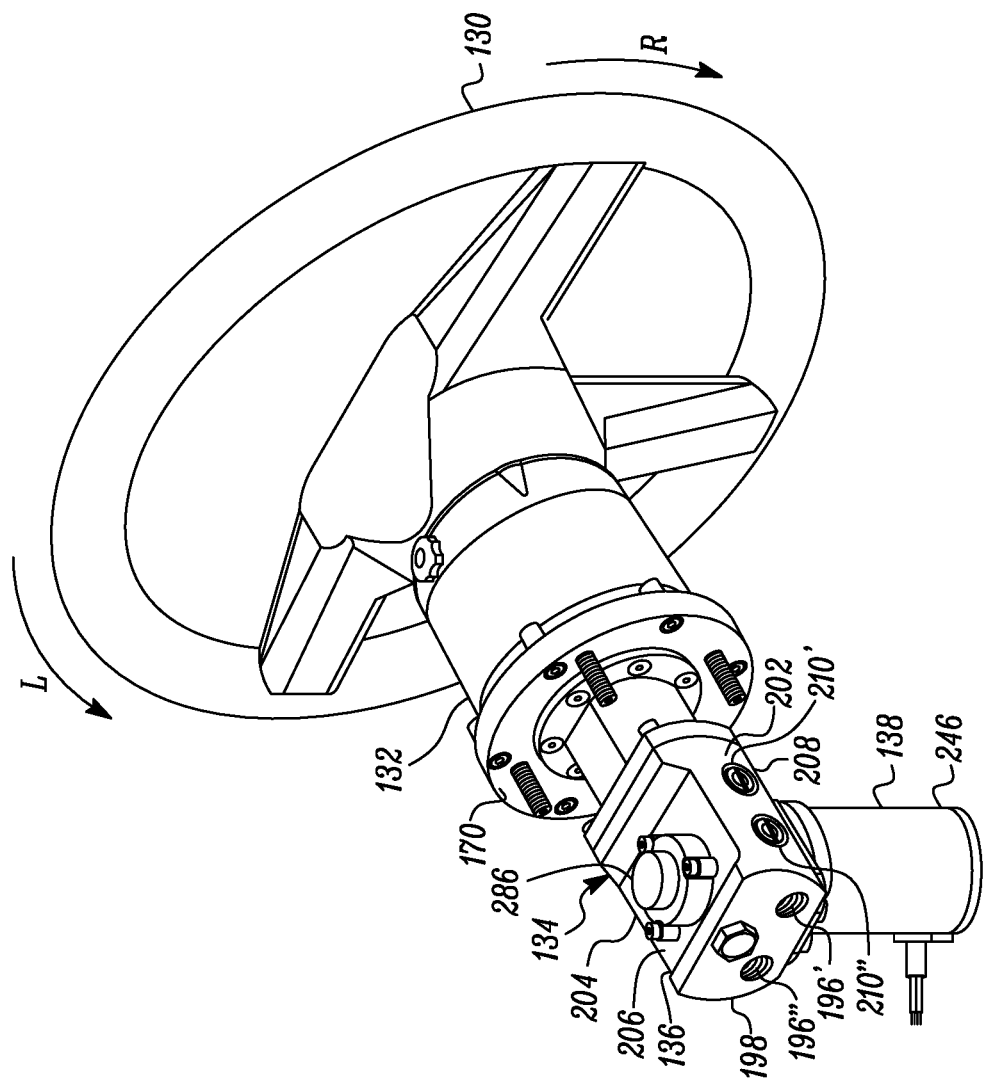
FIG. 3 is an assembled view of the steering assembly of FIG. 2, in accordance with an embodiment of the present disclosure.

Referring to FIG. 3, the steering circuit 122 (FIG. 1) is formed by interlaid components namely the helm pump 132, the lock valve body 136, and the steering cylinder 124. To this end, each of these components are fluidly coupled to each other by way of fluid lines 142, constituting a rather busy design that follows a general practice of the art. Moreover, the fluid lines 142 (represented by a first fluid line 144 and second fluid line 146) are interconnected between said components in a manner so as to impart a two-way fluid flow between each of the helm pump 132, the lock valve body 136, and the steering cylinder 124.

Figure 4:
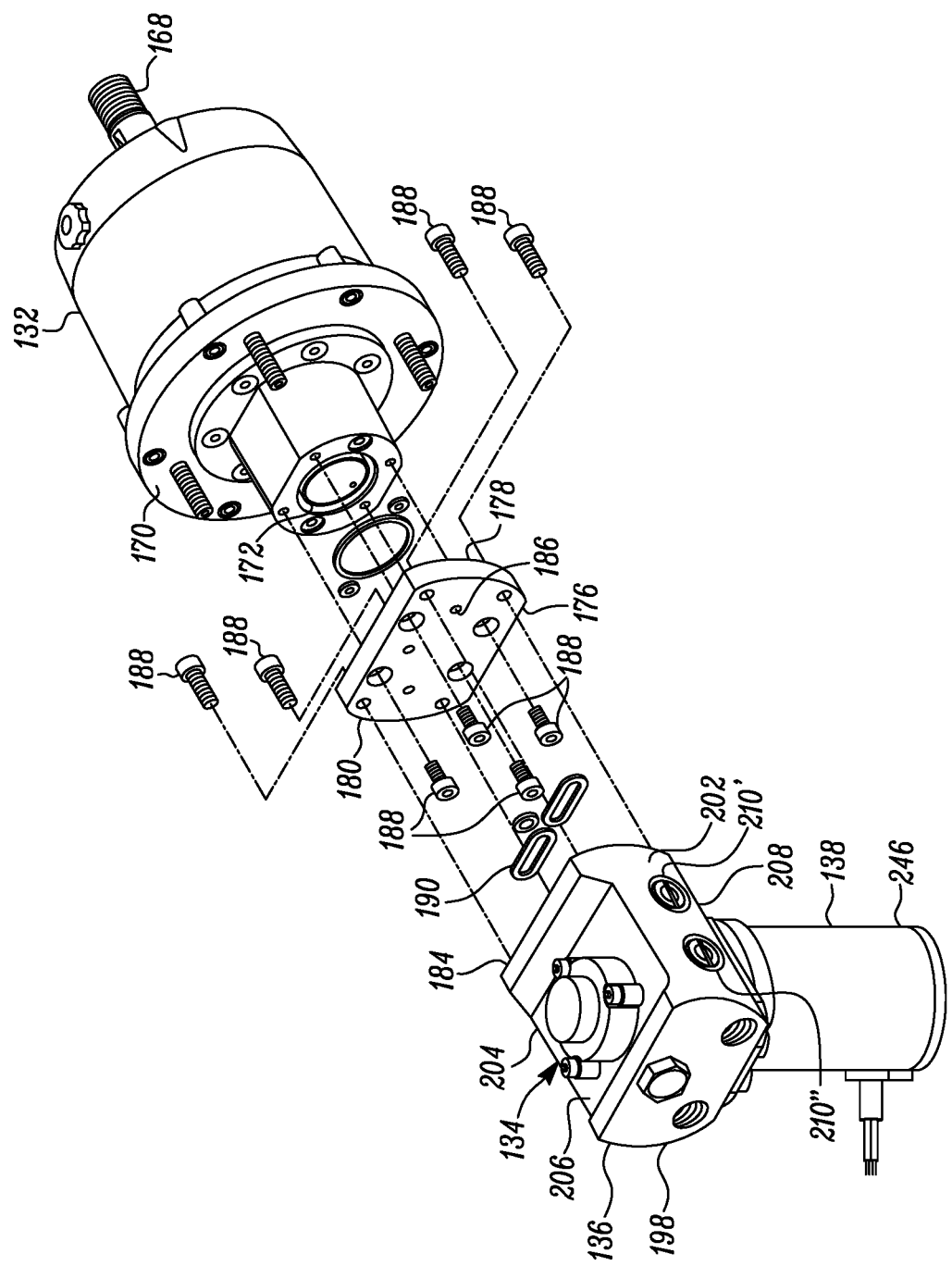
FIG. 4 is an isometric view of an exploded steering assembly of the hydraulic steering system of FIG. 3, in accordance with an embodiment of the present disclosure.

Referring to FIGS. 3 and 4, the steering input device 130 may be a steering wheel, although it is possible for the steering input device 130 to represent control levers, joysticks, etc., as well. The steering input device 130 may be arranged in an operator station 150 of the watercraft 100, such as within a dashboard 152 or a centre console of the watercraft 100. Such dashboards may include one or more control input devices alongside the steering input device. In an embodiment, the steering input device 130 and control input devices may be configured to communicate with one or more onboard controllers (not shown) of the watercraft 100 to perform various functionalities of the watercraft 100. For example, when the watercraft 100 is being operated in an auto steer mode, communication between the input devices and the onboard controller may be carried out. In an embodiment, such controllers may also include automatic control input devices such as open-loop controllers, closed-loop controllers, or programmable logic controllers. When in auto steer mode, the steering input device 130 may be used to override the automatic operations, for example, to make corrections outside of a programmed path. Additionally, remote control input devices such as wired or wireless telemetry devices, displays, combinations thereof, or any other control device known in the art, may also be contemplated. In an embodiment, the controller may include Global Positioning System (GPS) modules installed within that allows the watercraft 100 to be steered according to co-ordinates decided by a satellite, such as in the case of the auto steer mode of the watercraft 100.

Figure 2:
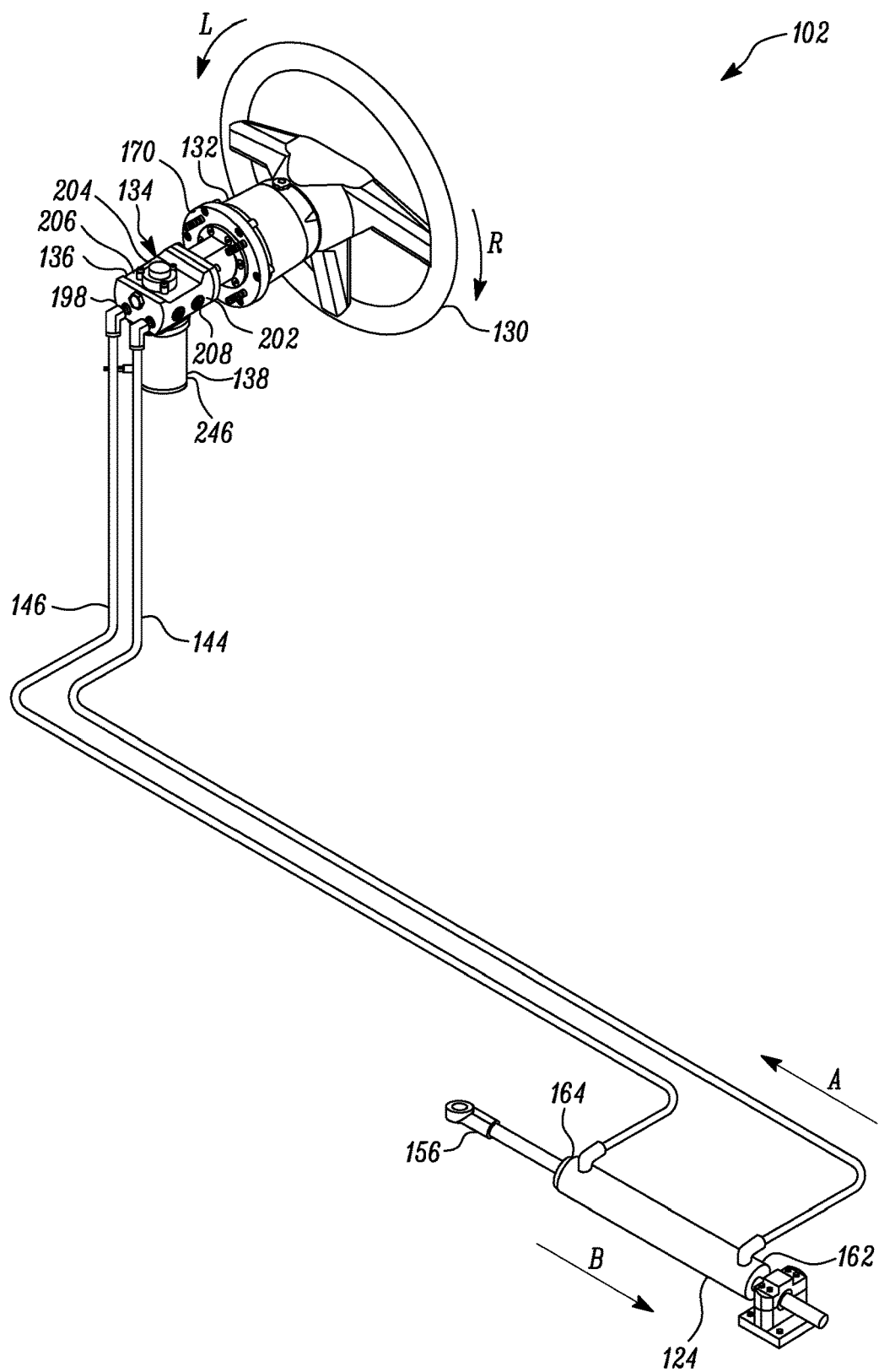
FIG. 2 is a steering circuit of the hydraulic steering system, in accordance with an embodiment of the present disclosure.

The steering input device 130 is configured to move/rotate between a left position and a right position, such as relative to the dashboard 152 (see arrows, L and R, FIG. 2). These denotations have been marked for ease in visualization and understanding. Moreover, these positions represent conventional steering positions and movement patterns that may be configured to alter a steering course of any conventional watercraft (such as watercraft 100), during operation. In an exemplary embodiment, if an operator moves the steering input device 130 to the right (arrow, R), fluid from the helm pump 132 is adapted to be released via the first fluid line 144, actuate the steering cylinder 124 in direction, A, so as to alter a direction of the rudder 126 and execute a watercraft turn along a direction that generally corresponds to the direction represented by arrow, R. Similarly, if the steering input device 130 is moved to the left (arrow, L), fluid from the helm pump 132 is adapted to be released via the second fluid line 146, actuate the steering cylinder 124 in direction, B, so as to alter a direction of the rudder 126 and execute a watercraft turn along a direction that generally corresponds to the direction represented by arrow, L. While fluid is released from the first fluid line 144 and the second fluid line 146 in each of these instances, fluid is also respectively received by the helm pump 132 via the other of first fluid line 144 and the second fluid line 146.

Referring back to FIG. 2, the steering cylinder 124 may be one of the commonly known steering cylinders in the art. The steering cylinder 124 includes a piston-connecting rod arrangement 156 that is slidably positioned within a cavity (not shown) of the steering cylinder 124. Said piston-connecting rod arrangement 156 is capable to reciprocate (direction, A and B) within the cavity of the steering cylinder 124 across a length of the steering cylinder 124. Such a movement may depend upon a direction of the fluid flow as and when received/released from the lock valve body 136. Portions of the cavity defined across an associated piston (not shown) form the first chamber and the second chamber of the steering cylinder 124, as known to those of skill in the art. The steering cylinder 124 may be an "inboard cylinder" type, which has a cylinder barrel axially fixed, while an associated cylinder rod may extend and retract relative to the cylinder barrel. Conversely, the steering cylinder 124 may have the cylinder rod fixed and the cylinder barrel axially movable relative to the cylinder rod. Using the latter cylinder type, may reverse the above noted description of the directions (see arrows, L and R, FIG. 2). Both the chambers are fluidly coupled to the lock valve body 136 via the first fluid line and 144 the second fluid line 146, so as to selectively receive and deliver fluid from/to, or facilitate a two-way fluid communication with the lock valve body 136. During operation, while one of the chamber is configured to receive fluid in response to an input from the steering input device 130, the other is configured to release fluid back into the steering circuit 122 and the helm pump 132. The steering cylinder 124 includes a first end 162 and a second end 164, and although variations to this design is possible, the steering cylinder 124 is configured to receive/release fluid from each of the first end 162 and the second end 164, via the fluid lines 144, 146, upon steering actuation.

Referring back to FIG. 1, the rudder 126 is connected to the piston-connecting rod arrangement 156 (see FIGS. 1 and 2 in combination) and is able to move according to a movement executed by the piston-connecting rod arrangement 156. In that way, the rudder 126 is powered by a movement of the piston-connecting rod arrangement 156. The rudder 126 is connected to the piston-connecting rod arrangement 156 via a complex set of linkages (not shown for clarity) that operate in concert and in response to an input from the steering input device 130 or the electric pump 138, such as when requested by an operator. Operator requests may include either of a manual input or an autopilot or a jog lever based input. Also, the set of linkages may embody mechanical rods, links, or cables.

Referring back to FIGS. 3 and 4, the helm pump 132 is a hydraulic helm pump, although other hydraulic pumps may be contemplated. The helm pump 132 is operably connected to the steering input device 130 such that the helm pump 132 may respond to the movement (left and right positions) received as input from the steering input device 130. The helm pump 132 may be a variable displacement pump. Moreover, the helm pump 132 may be an axial piston pump of a swashplate type, with a swashplate (not shown) that is fixedly connected to the steering input device 130 via a pump shaft 168 (FIG. 4), such that a movement/rotation of the steering input device 130 may result in a movement/rotation of the swashplate. The helm pump 132 may be attached inwardly to the dashboard 152 of the watercraft 100. The pump shaft 168 may be projected outwardly so as to be connected to the steering input device 130, as is conventionally known. In that way, the steering input device 130 may remain accessible to an operator stationed in the operator station 150.

In an embodiment, the helm pump 132 may include a wobbling swashplate, a cylinder block, and a number of pistons (not shown) that reciprocate within compression cylinders of the cylinder block, relative to a movement between the wobbling swashplate and the cylinder block (not shown). The helm pump 132 includes a back panel 170 and may house a commutator valve 172, for example, to transmit fluid housed within the helm pump 132 to the lock valve body 136 upon operator request (such as by actuation of the steering input device 130 to either of the left or right positions). The helm pump 132 may be configured to alternate delivery of a fluid flow based on an input from the steering input device 130, such as by advancing a flow from one portion of the helm pump 132, while receiving a flow from another, so as to hydraulically affect an alternation between swayed positions of the rudder 126. In so doing, the helm pump 132 facilitates watercraft steering. As an example, if the operator shifts the steering input device 130 to the left (arrow, L), corresponding pistons within the compression chamber of the helm pump 132 may compress against a fluid housed within the helm pump 132. As a result, said fluid may be pushed out from the helm pump 132 to the lock valve body 136, and then from the lock valve body 136 all the way to the steering cylinder 124 via the first fluid line 144. A movement of the piston-connecting rod arrangement 156 may move to affect a movement of the rudder 126 and enable watercraft steering.

In the forthcoming description, the term 'forward' may be applied for components, and portions of said components, as being directed outwards of the dashboard 152 towards an operator input region (i.e. from where an operator may access the steering input device, such as the operator station 150). Similarly, 'rearward' may be applied to any component, or portions of said components, that are directed away from the operator input region.

The helm pump 132 includes a transfer plate 176. The transfer plate 176 includes a first end 178 and a second end 180. In assembly, the first end 178 faces a forward direction, and is connected to the back panel 170 which is rearward of the helm pump 132. The second end 180 of the transfer plate 176 is connected to a forward face 184 of the lock valve body 136. The transfer plate 176 may include inbuilt fluid ports 186, and thereby facilitate fluid connection between the helm pump 132 and the lock valve body 136. The transfer plate 176 may be connected to the back panel 170 via threaded fasteners 188, such as by bolts and screws, as shown, and may be in turn be connected to the lock valve body 136 by being fastened at alternate locations via similar fastening means. In order to enable a secure transmission of fluid and prevent fluid leakage from between the helm pump 132 and the lock valve body 136, multiple O-ring seals 190 may be provided at the associated interfacial connection portions formed by the transfer plate 176 with both the helm pump 132 and the lock valve body 136, as shown. Known components such as washers, and the like, may also be included. To this end, grooves, and the like, may be defined on one or more associated fastening locations of the helm pump 132, the transfer plate 176, and the lock valve body 136, to receive the O-ring seals 190.

The steering system 102 is configured to operate in manual mode and an auto steer mode, as aforementioned. To this end, the lock valve body 136 and the electric pump 138 of the auxiliary drive assembly 134 are in abutment, and are operably integrated and interconnected with each other (discussed in detail further below). To attain a manual mode of operation of the steering system 102, the steering input device 130 may operate in conjunction with the lock valve body 136 alone. However, to attain an auto steer mode of operation, the lock valve body 136 and the electric pump 138 may function in concert with each other when an input from the steering input device 130 is absent. In particular, the electric pump 138 may be configured to provide fluid housed within the lock valve body 136 with a requisite amount of fluid pressure in a desired direction to replicate an operational intent of the steering input device 130. Additionally, in either of the manual mode or the auto steer mode, each of said components are tasked to either translate a motion of the steering input device 130 or of the electric pump 138 to a movement of the rudder 126 by fluid power, as will be elaborated further below.

The lock valve body 136 embodies a dual lock valve configuration and includes an inner configurations with multiple fluid inflow ports and fluid outflow ports. Out of the multiple inflow and outflow ports, at least two input ports 194 and at least two delivery ports 196 (see FIGS. 8 and 9) are included in the lock valve body 136, although higher or a lesser number of ports 194, 196 may be contemplated depending upon flow requirements of an associated operation. The input ports 194 are structured and arranged towards the forward face 184 of the lock valve body 136, while the delivery ports 196 are structured and arranged towards a rearward face 198 of the lock valve body 136. Further, the lock valve body 136 includes one or more fluid passages that facilitate a passage of fluid across the lock valve body 136 (such as from the input ports 194 to the delivery ports 196). By way of the ports 194, 196, the fluid passages, and a set of other components, such as valves (discussed later) within the lock valve body 136, the lock valve body 136 is configured to regulate a fluid flow in response to an input received from either of the steering input device 130 or the electric pump 138, and deliver the fluid to the steering cylinder 124 for an actuation of the rudder 126.

Figure 5:
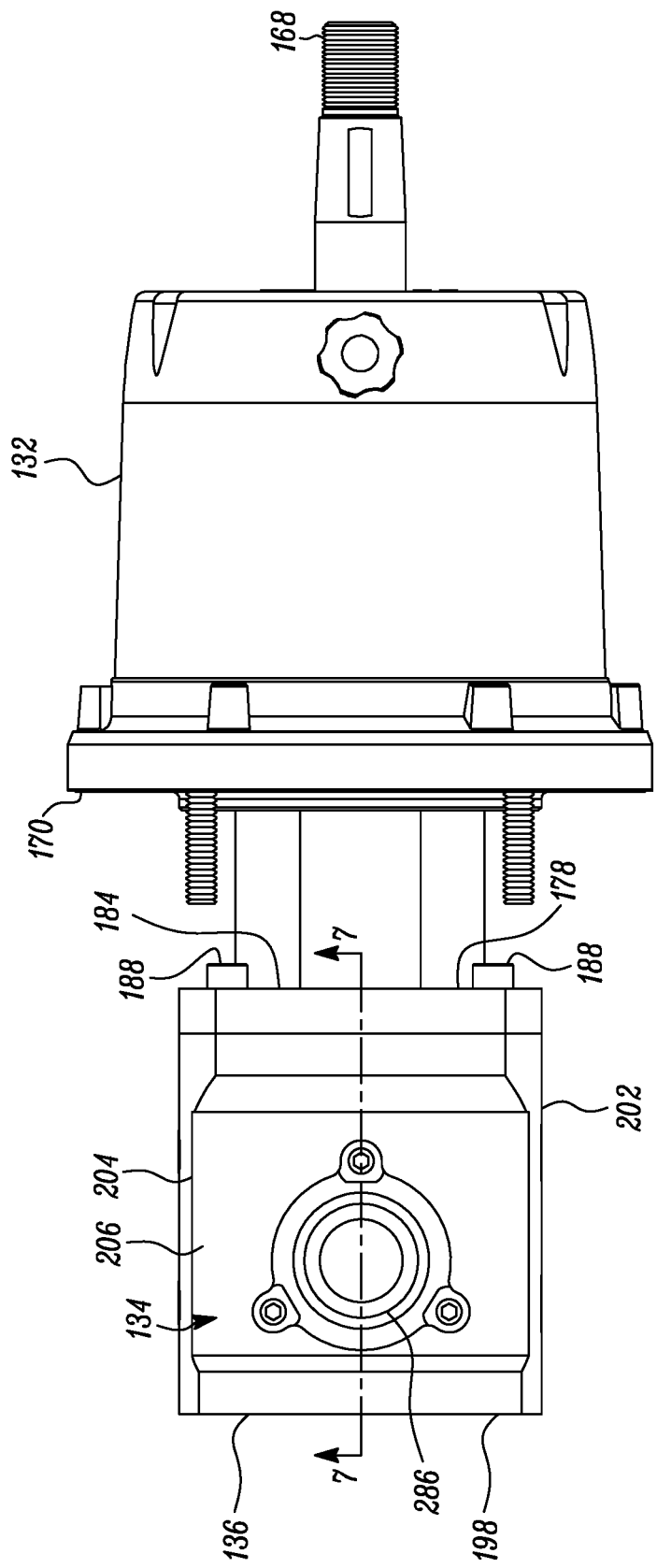
FIGS. 5 and 6 are respective top and side views of the steering assembly, in accordance with an embodiment of the present disclosure.
Figure 6:
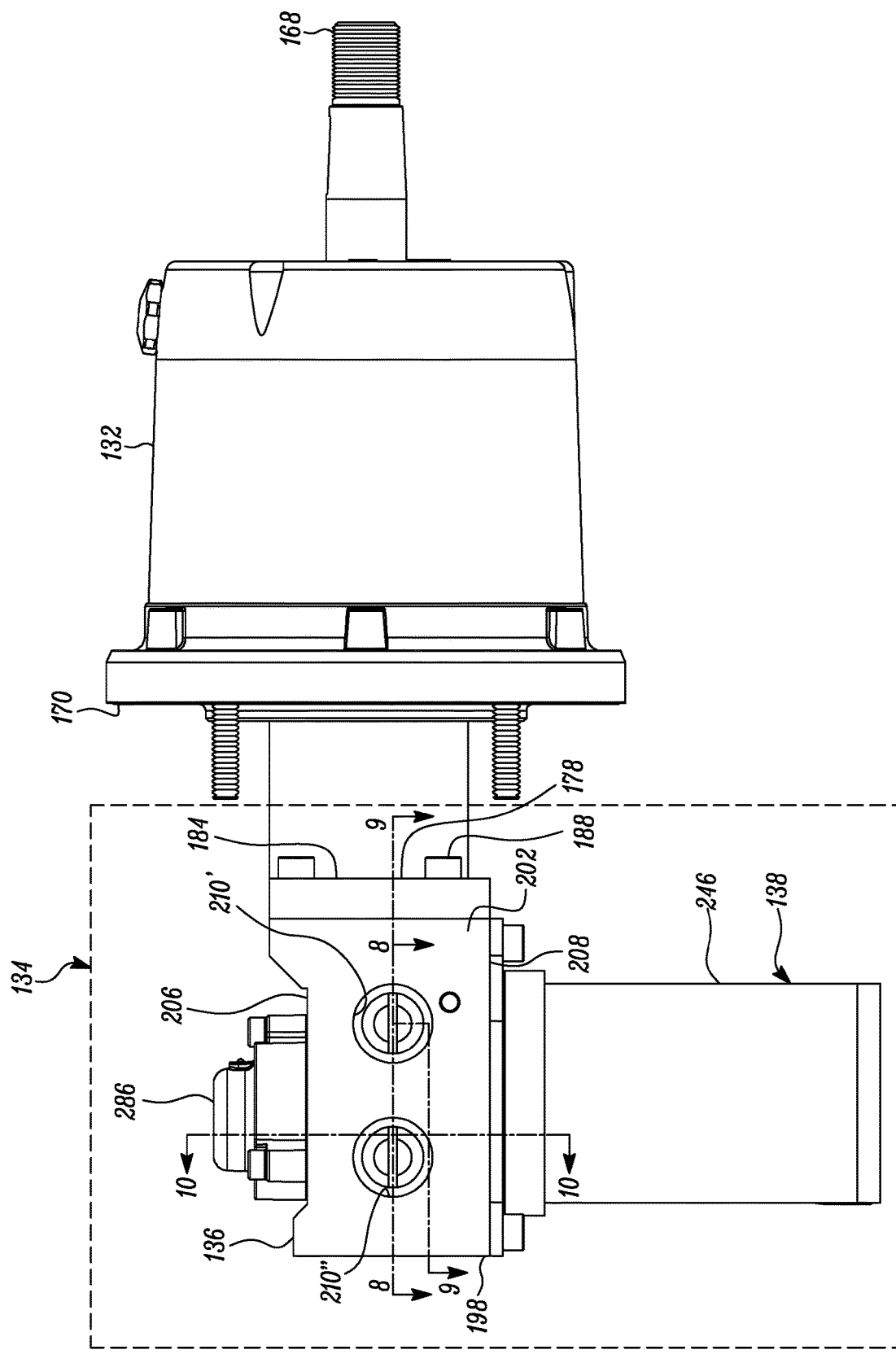

Referring to FIGS. 5 and 6, the steering assembly 120 is shown from varied view angles. More particularly, FIG. 5 is shown to include a top view of the steering assembly 120, while FIG. 6 is shown to include a side view of the steering assembly 120. FIGS. 5 and 6 also depict a variety of sections that are reproduced in following figures (namely FIGS. 7, 8, 9, and 10) to better understand an inner form, shape, and structure of the fluid passages, ports, associated flow directions, and various other configurational aspects of the lock valve body 136.

Figure 7:
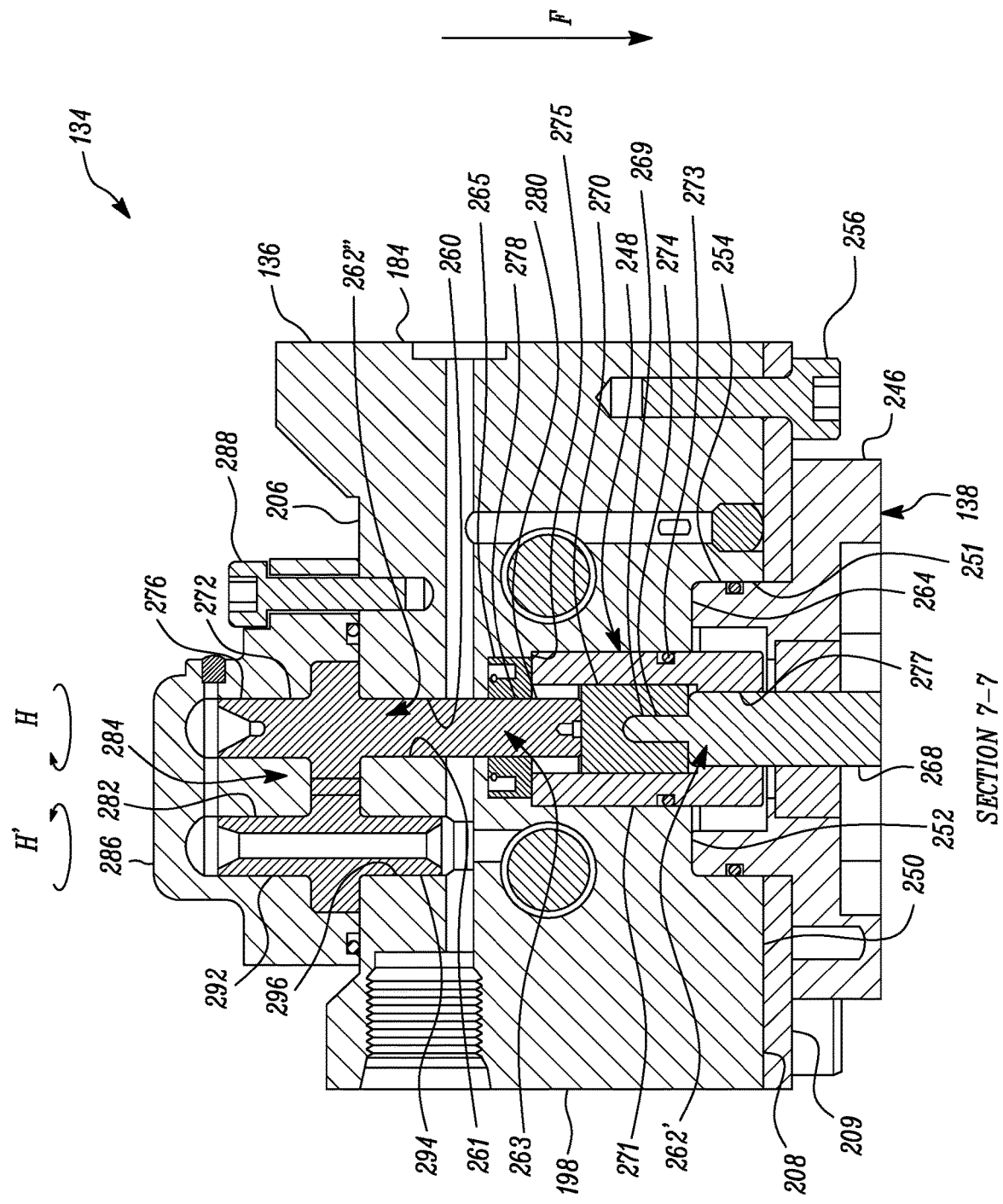
FIGS. 7, 8, 9, and 10, are sectional views 7-7, 8-8, 9-9, and 10-10, of the steering assembly respectively, as has been disclosed in FIGS. 5 and 6, in accordance with an embodiment of the present disclosure.

Referring to FIGS. 2, 3, 4, and 5, a construction of the lock valve body 136 is described. The lock valve body 136 embodies a generally cuboidal shape, with lateral faces (first lateral face 202 and second lateral face 204, see FIGS. 2, 3, 4, and 5) on either sides that define curved contours, such as having a curvature starting from a top face 206 (represented as an upper surface along an elevation) of the lock valve body 136 and ending at a bottom face 208 along an elevation of the lock valve body 136, as shown in FIG. 7. Such a characteristic shape may allow the lock valve body 136 to be efficiently accommodated behind/within confinements available rearward of the dashboard 152 or the centre console (see FIG. 1).

Referring to FIGS. 7, 8, 9, and 10, input ports 194 are structured within the lock valve body 136 such that the input ports 194 are revealed at the forward face 184, while delivery ports 196 are structured within the lock valve body 136 such that the delivery ports 196 are revealed at the rearward face 198. Although the nomenclature of the input ports 194 and the delivery ports 196, a function associated with each of the input ports 194 and the delivery ports 196 may also include receiving the fluid from the steering cylinder 124 to be eventually delivered to the helm pump 132, and thus the delivery ports 196 and the input ports 194 may be well configured to perform reverse functionalities as well (i.e. to receive fluid from the steering circuit 122). The input ports 194 are extended into the lock valve body 136 such that a common plane is defined therebetween. Similarly, the delivery ports 196 are also extended into the lock valve body 136 such that a similar common plane is defined therebetween. The planes of the input ports 194 and the delivery ports 196 are defined with an offset to each other, along an elevation of the lock valve body 136. Said planes may be parallel to each other as well. In particular, the plane of the input ports 194 may be higher in elevation than the plane of the delivery ports 196, as may be envisioned by viewing section 9-9 (or FIGS. 6 and 9 together). Nevertheless, it may be contemplated in certain alternatives that the input ports 194 and the delivery ports 196 are defined along a common plane, as well. Although not limited, planes of the input ports 194 and the delivery ports 196 are parallely defined relative to the top face 206 and the bottom face 208.

The input ports 194 and the delivery ports 196 are exemplarily two in number, while it is possible that additional ports may be included that serve alongside said ports 194, 196. In general, the input ports 194 are represented by a first input port 194' and a second input port 194", as shown. Similarly, the delivery ports 196 are represented by a first delivery port 196' and a second delivery port 196". The input ports 194 are configured to receive fluid as input from the helm pump 132. This fluid is transmitted via connecting passages 218 (see FIG. 9), depending upon a direction of rotation of the steering input device 130, to the delivery ports 196. Based on such a receipt, the delivery ports 196 are configured to deliver fluid from the lock valve body 136, as an output, to the steering cylinder 124 for steering actuation. Such a flow path of fluid is also reversible, for example when the steering input device 130 is rotated in reverse to the above direction. In operation, when the first input port 194' receives fluid flow from the helm pump 132 in response to an input of the steering input device 130, the second input port 194" returns a fluid flow to the helm pump 132, and similarly, as an input of the steering input device 130 facilitates release of a fluid flow into the second input port 194", a fluid flow may be received by the helm pump 132 via the first input port 194'. In all instances, fluid delivered by an actuation of the steering input device 130 releases fluid along one fluid line 144, 146 and receives fluid from the other fluid line 144, 146, effectively defining a closed-loop hydraulic system. Exemplarily, a fluid released by an input of the steering input device 130 when transmitted to the first (or second) input port 194', 194", further flows down into the first (or second) delivery port 196', 196" and flows out all the way to one end of the steering cylinder 124 to affect the steering cylinder's actuation. Simultaneously, a fluid flow returns from the steering cylinder 124 to the lock valve body 136 via the second (or first) delivery port 196", 196' and all the way to the helm pump 132 via the second (or first) input port 194", 194'. A similar fluid flow is envisioned when the electric pump 138 is used to apply fluid pressure (discussed below).

Further, multiple bores 210 are structured within the lock valve body 136. The bores 210 are exemplarily two in number (first bore 210' and second bore 210") each of which is adapted to accommodate a spool valve 212 that is pilot operated. The spool valve 212 is representative of a first spool valve 212' and a second spool valve 212". The spool valve 212 is a double acting—pilot operated check valve. The bores 210 are structured so as to extend transversally to the lock valve body 136, such as from the first lateral face 202 and the second lateral face 204. In that way, the bores 210 are substantially perpendicular to the delivery ports 196 and the input ports 194 in layout. The first bore 210' is positioned in closer proximity and in fluid communication with the input ports 194 while the second bore 210" is positioned in closer proximity and fluid communication with the delivery ports 196 (see FIGS. 8 and 9). The bores 210 are structured and arranged serially relative to each other with the second spool valve 212" being positioned towards the rearward direction of the steering system 102. A plane defined by the disposal of the bores 210 is parallel to the planes defined by the delivery ports 196 and the input ports 194. Variations to this configuration is possible such as by having the plane of the bores 210 being positioned at an angle to either of the planes of the delivery ports 196 or the input ports 194. Further, each of the bores 210 may include an end fitting 216 arranged at either ends of the bores 210. In an example, the end fitting 216 may threadably coupled to either ends of the bores 210 and may include hex key slots by which the end fitting 216 may be tightened into outwardly revealed openings on the lateral faces 202 and 204 of the bores 210.

One or more fluid passages are structured within the lock valve body 136 connecting said bores 210', 210" to each other. In general, one or more of the fluid passages facilitate a fluid flow between the input ports and the delivery ports. The first bore 210' is in selective fluid communication with the input ports 194, as facilitated by the first spool valve 212', and the second bore 210" is in fluid communication with the delivery ports 196, as facilitated by the second spool valve 212". Connecting passages 218 (a first connecting passage 218' and a second connecting passage 218") are provided within the lock valve body 136 at a generally higher elevation in relation to the plane of the bores 210 and the ports 194, 196 (see FIGS. 6, 8, and 9 in combination). In particular, the first connecting passage 218' is in selective fluid communication with the first input port 194', while the second connecting passage 218" is in selective fluid communication with the second input port 194", as facilitated by the first spool valve 212'.

However, the first connecting passage 218' is in lasting fluid communication with the first delivery port 196' and the second connecting passage 218" is in lasting fluid communication with the second delivery port 196", as facilitated by by-passing the second spool valve 212". In that way, the connecting passages 218, by way of the first spool valve 212', facilitate a regulation of fluid released and received into the helm pump 132 via the input ports 194, by-passing any form of regulation from the second spool valve 212" during operation. Such an operational parameter constitutes a manual mode of watercraft operation, and an operation of which will be discussed later.

Figure 10:
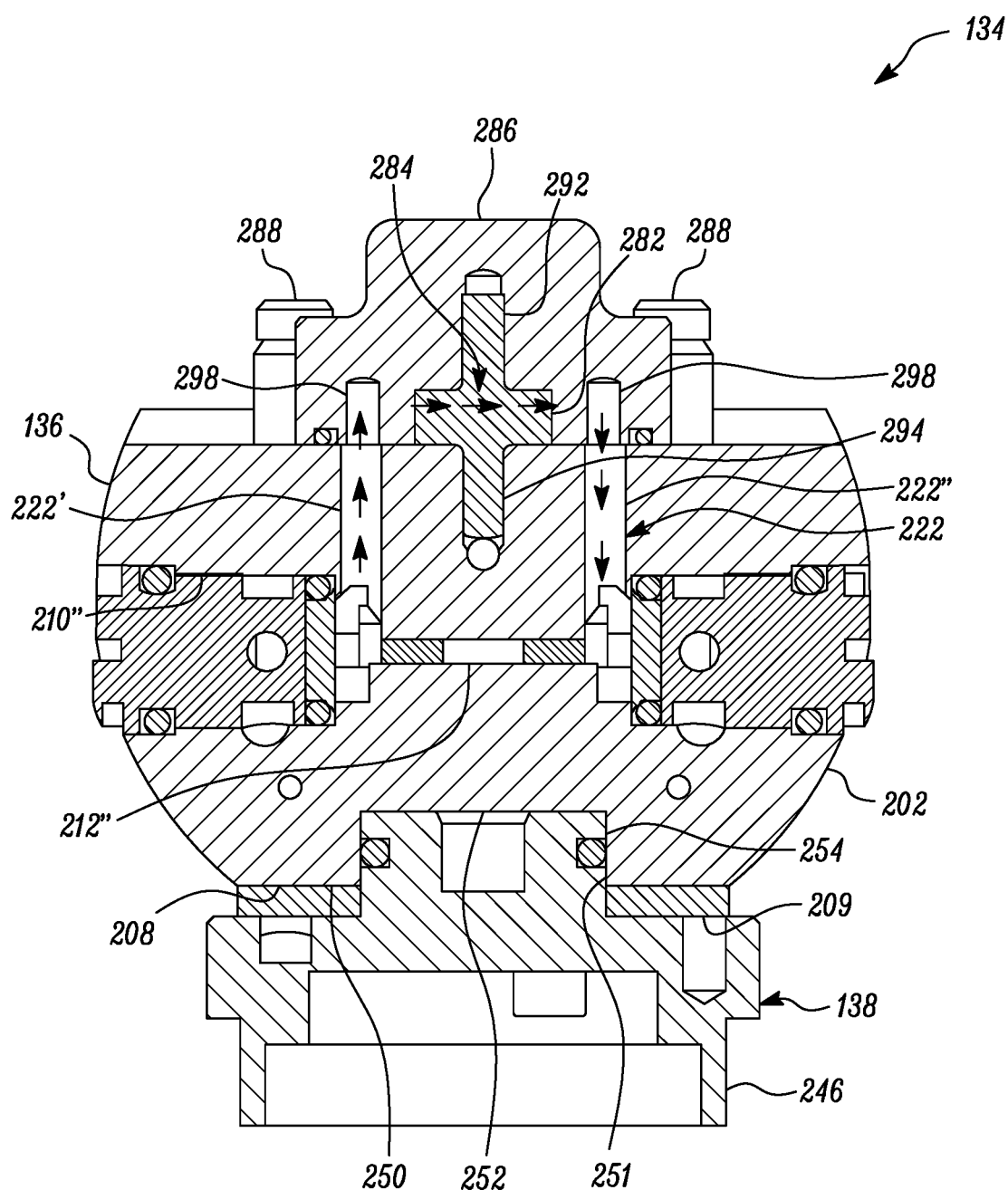

Referring to FIG. 10, and as part of the one or more fluid passages, a pair of upright fluid passages 222 (represented by a first upright passage 222' and a second upright passage 222") are fluidly coupled and extended from the second bore 210" along an elevation, E, of the lock valve body 136. The upright fluid passages 222 are perpendicularly defined to the second bore 210". Openings of the upright fluid passages 222 are revealed at the top face 206 of the lock valve body 136. A plane defined by the upright fluid passages 222 is perpendicular to the planes of the delivery ports 196 and the input ports 194, although allowable variations may be contemplated. The upright fluid passages 222 are in selective fluid communication with the delivery ports 196 as facilitated by the second spool valve 212". The upright fluid passages 222, second spool valve 212", second bore 210", in combination with the delivery ports 196, are in concert configured to facilitate transmission of fluid during an auto mode of watercraft operation.

Figure 8:
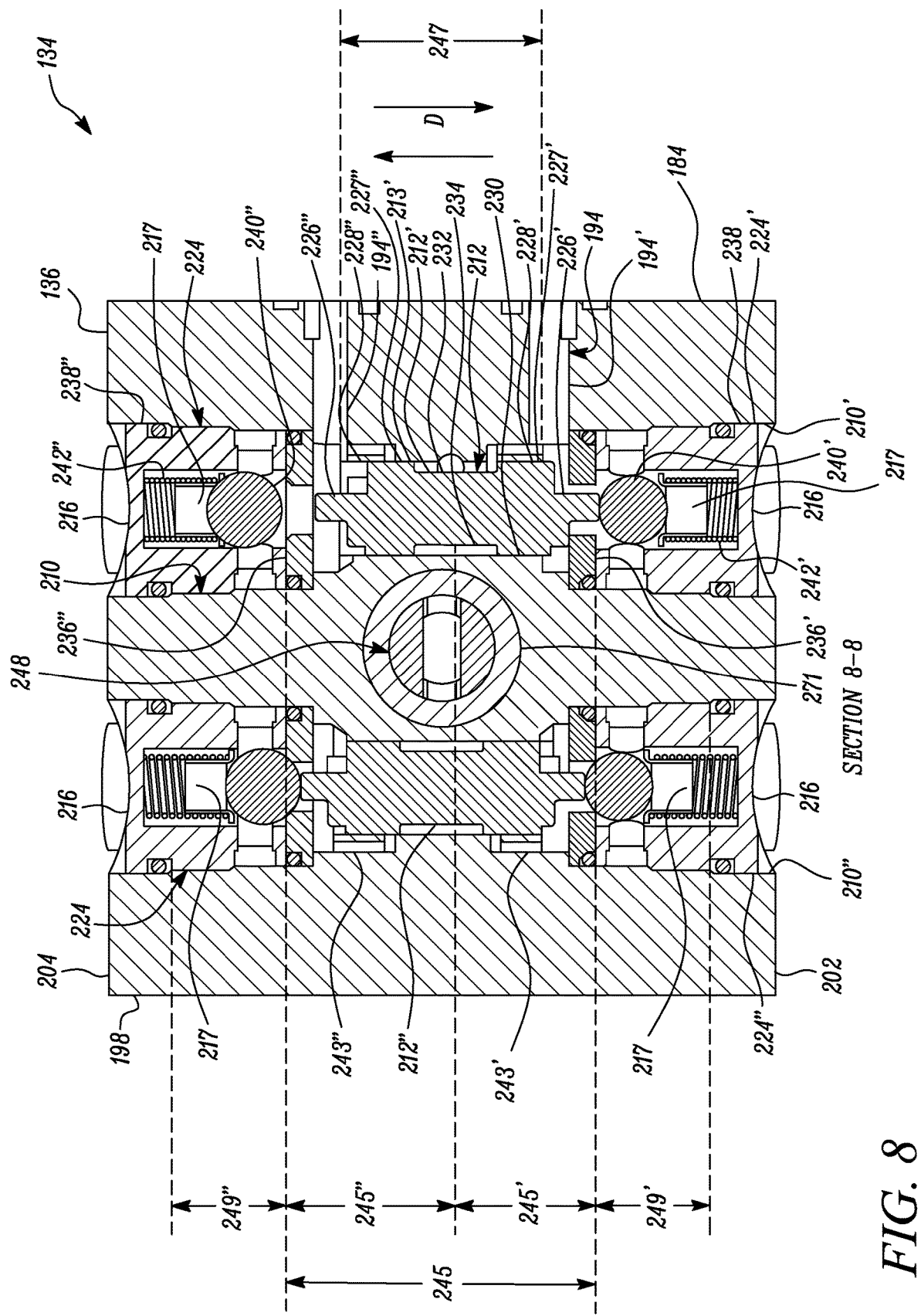

Referring to FIG. 8, details of the spool valve 212 will now be discussed. Collectively, an assembly of the spool valve 212 (such as the first spool valve 212') within the bores 210 (such as the first bore 210') is referred to as a spool valve arrangement 224 (such as a first spool valve arrangement 224'—while the corresponding second spool valve arrangement being referred as second spool valve arrangement 224"). Given the lateral disposal of the bores 210 relative to the lock valve body 136, a disposal of the spool valve arrangements 224', 224" is also defined at right angles to both the delivery ports 196 and the input ports 194. The first spool valve 212' is adapted to block the connecting passages 218 from fluidly communicating with the input ports 194. More specifically, in a default state of the first spool valve 212', or in a neutral state of the steering input device 130, a flow between the input ports 194, the connecting passages 218, and the delivery ports 196 is open, while a flow from the connecting passages 218 to the input ports 194 is blocked. Similarly, the second spool valve 212" is adapted to block the delivery ports 196 from fluidly communicating with the upright fluid passages 222, while a fluid flow from the upright fluid passages 222 to the delivery ports 196, via the connecting passages 218, is open, such as in a default state of the second spool valve 212", and/or when the electric pump 138 is inactive.

The forthcoming description includes references focused towards the first spool valve arrangement 224', unless specified otherwise. For clarity, details of only the first spool valve arrangement 224' is marked and discussed. It will be understood that discussions directed towards the first spool valve arrangement 224' will remain similar for the second spool valve arrangement 224", as well.

The first spool valve 212' has a first spool 213' reciprocatingly received within the first bore 210'. The first spool 213' has a first end 226' and a second end 226". The first end 226' includes a first annular cylinder portion 227', while the second end 226" includes a second annular cylinder portion 227". The first bore 210' includes a first end portion 228' adjacent to the first end 226' and a second end portion 228" adjacent to the second end 226". The first end portion 228' has a larger diameter than the first annular cylinder portion 227' and a circumference (or an inner wall 230) that is slidingly and sealingly engaged with the first annular cylinder portion 227'. Similarly, the second end portion 228" has a larger diameter than the second annular cylinder portion 227" and a circumference (the inner wall 230) that is slidingly and sealingly engaged with the second annular cylinder portion 227". A center portion 232 of the spool 213' is structured between the first annular cylinder portion 227' and the second annular cylinder portion 227". The center portion 232 is smaller in diameter than the first annular cylinder portion 227' and the second annular cylinder portion 227", in turn defining an annular passageway 234 between the first annular cylinder portion 227' and the second annular cylinder portion 227", relative to the first bore 210'.

Also, first spool valve 212' includes ball portions (first ball 240', second ball 240"), which are respectively resiliently biased towards ball seats 236', 236" by compression springs 242', 242". Also, the balls 240', 240" are guided concentric with an axis of the first bore 210' by the end fitting 216 of the first bore 210'. Further, compression springs 242', 242" of both the balls 240', 240" may include a spring force which is identical to each other. With both ends 226', 226" of the first spool 213' being in selective engagement with the balls 240', 240", the first spool 213' is biased towards a center of the first bore 210', and, in that manner, a default state of the first spool valve 212' is attained. A gap may respectively exist between ends 226', 226" of the first spool 213' and the balls 240', 240" to ensure a seating. In this default state of the first spool valve 212', a fluid flow between connecting passages 218 to outer zones 249', 249", further to a center zone 247 and to input ports 194 is blocked in the valve default state. In an embodiment, one (or both) of the spool valves arrangements (such as the second spool valve arrangement 224") may include structural configurations and features in relation to a corresponding inner wall of the related bore (such as the second bore 210") that ensure maintenance of a balance of fluid volume in the lock valve body 136. For example, leak paths 243', 243" (FIG. 8) may be provided adjacent the second spool valve arrangement 224", in fluid communication with the second bore 210", such that in strategic position of the second spool valve 212" a quantity of fluid may be directed to a reservoir (not shown). Similar leak paths (not shown) may be present in the first spool valve arrangement 224' as well. In general, the structure of the second spool valve arrangement 224" and the balls 240', 240" is conventional and therefore is not described in further detail. In an embodiment, other types of one-way valves could be employed as well, such as poppet valves.

Referring to FIGS. 7, 8, 9, and 10, a general operative aspect of the spool valve 212 is discussed by envisioning that the first spool valve 212' is set in a mid-position of the first bore 210' (see FIG. 8). In operation, the second ball 240" is held against an adjoining ball seat 236" by an action of the compression spring 242". An end of the compression spring 242", in contact with the second ball 240", may be reinforced against unwinding by an insertion of a metallic ferrule 217, as is customarily known. Also, at this stage the first ball 240' is held against adjoining ball seat 236' by an action of the compression spring 242' and the metallic ferrule 217. When the steering input device 130 is operated, fluid is forced into the second input port 194". This fluid is restricted from exiting the lock valve body 136 until the fluid overcomes the axial load that may hold the second ball 240" against the ball seat 236". After overcoming the axial load, the fluid attempts to run into the steering cylinder 124 via second connecting passage 218" and second delivery port 196". The steering cylinder 124 may operate when a returning fluid is allowed to return to the helm pump 132 via the lock valve body 136. However, for this to occur, the first ball 240' is required to be unseated from an associated ball seat 236' so as to open the first connecting passage 218'. As the pressure in second input port 194" increases, the pressure builds up and exerts an axial force on the first spool 213'. This force shifts the first spool 213' towards the ball 240' (direction, D), unseating the first ball 240' from the ball seat 236' and allowing the returning fluid to pass into the first input port 194', all the way back into the helm pump 132.

The lock valve body 136 includes four chambers (see FIGS. 8 and 9), with two chambers being defined per spool valve arrangement 224', 224". For spool valve arrangement 224', for example, an inner chamber (or inner zone 245, FIGS. 8 and 9) of the bore 210'. Inner zone 245 is defined by area inside a plane of a seal surface of ball seats 236', 236" and inside surface of bore 210'. This area is blocked in the center zone 247 by the presence of the first spool 213'. This effectively splits inner chamber into 245' and 245" (FIG. 8). Further outer chambers (or outer zones 249', 249", FIG. 8) are defined by areas outside of a plane of a seal surface of ball seats 236', 236" and seal point of O-ring seal of end fittings 216 and the inside surfaces of the bore 210'. The outer zones 249', 249" are similarly defined in the bore 210" and are in permanent communication with outer zones 249', 249" of bores 210', 210" via connecting passages 218. Ports 194 & upright passages 222 (FIG. 9) may transmit fluid past the ball seats 236', 236", however connecting passages 218', 218" may be unable to transmit fluid past the ball seat 236', 236" unless the spool valves 212', 212" have shifted to unseat the ball seat 236', 236".

Referring to FIGS. 3, 4, and 7, the electric pump 138 is discussed. The electric pump 138 is configured to interact and provide input to the lock valve body 136 (or selective regulation of fluid in one or more passages), such as in an auto steer mode of operation, or in a jog or power assist mode (for example, when running along with the helm pump 132) of the steering system 102. More specifically, the electric pump 138 is configured to regulate fluid flow in and out of the upright fluid passages (FIG. 10) 222 to regulate fluid flow back and forth of the steering cylinder 124, enabling automatic or power assisted watercraft steering. To this end, the electric pump 138 includes an electric motor 246 with a drive train unit 248.

The electric motor 246 is connected with the one or more controllers of the watercraft 100 by which control commands may be received and enacted upon by the electric motor 246. In general, the electric pump 138 is an electrically powered pumping device that is capable of reversing a pumping direction within the steering circuit 122 by reversing a polarity of a voltage delivered to motor brush leads (not shown) of the electric motor 246. In effect, the electric pump 138 is also a pump, similar to the helm pump 132, but is an electrically powered device. The electric motor 246 includes a flange 209, which is assembled as a separate component, generally to a front portion (or a forward nose portion 254) of the electric motor 246. The flange 209 facilitates the connection of the electric motor 246 to other components of the steering assembly 120 (in this case—the lock valve body 136). Optionally, the flange 209 may be integrally formed with an outer body of the electric motor 246, as well. In some implementations, other motor types may also be used—brushless—step. Such motors may have alternate methods of reversing a rotational direction of a driveshaft 268 (discussed later) of the electric motor 246.

In an embodiment, controller(s) of the of the watercraft 100 may provide the electric motor 246 with details pertaining to a speed and a direction of rotation required to push and regulate the fluid housed within the lock valve body 136 so as to steer the watercraft 100, based on detected geographical co-ordinates of the watercraft 100, for example. Additionally, the controller may also be able to process data pertaining to an onward course of the watercraft 100, and upon delivery of a related signal, the electric motor 246 may be able to take an action, such as alter a speed or change a direction of rotation of the drive train unit 248, for example to avoid/allow the watercraft 100 to travel along an onward course.

The lock valve body 136 includes a surface 250 at the bottom face 208 and a stepped guide bore 260 (or simply a guide bore 260) structured through the bottom face 208 into the lock valve body 136. The surface 250 forms a mounting portion for the electric motor 246, facilitating the electric motor 246 to be directly coupled to the lock valve body 136, via the flange 209.

An integration of the electric pump 138 to the lock valve body 136 is such that the electric pump 138 is directly mounted and coupled to the surface 250 of the lock valve body 136, with the flange 209 falling in between the surface 250 and the front portion (or a forward nose portion 254) of the electric motor 246. The surface 250 includes a portion to accommodate the forward nose portion 254 of the electric motor 246. This portion is referred to as a motor seat 251. The motor seat 251 includes a recess 252 structured in the lock valve body 136. The recess 252 may be a depression formed in the surface 250 of the lock valve body 136, such as via a conventional manufacturing processes including milling, boring, etc. Although not limited, the recess 252 may be circular in shape (or cross-section) and may include fastener inserting portions (not shown) so as to allow the electric pump 138 (or the electric motor 246) to be secured to the surface 250 by conventional attachment means. For example, the electric pump 138 (or the electric motor 246) may be insertable into the recess 252, and be connected to the surface 250 via one or more bolts 256 (see FIG. 7), as may be envisioned by someone in the art. In an embodiment, the flange 209 provided at the forward nose portion 254 of the electric motor 246, and which is to be secured to the surface 250 during assemblage, includes fastening locations for ensuring a mounting/securement of the electric motor 246 to the lock valve body 136 via bolt 256. The motor seat 251 is formed in a manner so as to refrain from interfering with the structural arrangement and integrity of the fluid passages (such as the connecting passages 218 and the upright fluid passages 222) and the ports 194, 196. In general, a structure of the motor seat 251 may complement a shape of the forward nose portion 254 of the electric motor 246, as well.

In an embodiment, the motor seat 251 may be angularly structured and arranged on the lock valve body 136, such as in a location alternate to the bottom face 208. However, it will be understood that such variations may be incorporated without interfering with an overall shape and profile of the passages 218, 222, and bores 210. Such alternatives and variations may be contemplated by someone in the art, without departing from the scope and spirit of the aspects of the present disclosure.

The guide bore 260 includes a drive gear journal bore 261. The guide bore 260 passes generally centrally through the lock valve body 136 to facilitate passage of the drive train unit 248 through the lock valve body 136. The guide bore 260 has an opening 262" that is revealed at the top face 206 of the lock valve body 136 and an opening 262' at a bottom inner face 264 of the recess 252. The guide bore 260 includes a generally stepped configuration, with an intermediate stepped profile defining an intermediate opening 263 within the guide bore 260, and where a lip oil seal 265 is seated. As with the recess 252, the stepped configuration of the guide bore 260 may be manufactured through conventional machining operations, such as those attained by performing a boring operation on a lathe. In an embodiment, the guide bore 260 is generally perpendicularly formed relative to the one or more planes defined by the bores 210 and the ports 194, 196. In an embodiment, the stepped configuration of the guide bore 260 allows various structural aspects of the electric pump 138 to be properly incorporated with the lock valve body 136, as will be further discussed.

Referring to FIG. 7, the drive train unit 248 includes the driveshaft 268 and a coupling 270. The driveshaft 268 is generally an extension of a rotor portion of the electric motor 246. The coupling 270 is compliantly connected to a farther end 274 of the driveshaft 268 and positioned generally towards the top face 206 when assembled with the lock valve body 136. In operation, the coupling 270 is adapted to rotate along with a rotation of the driveshaft 268 (direction, H, FIG. 7). For this purpose, the coupling 270 may be in engagement with a coupler key 269, formed at the farther end 274, which restricts a rotational movement of the driveshaft 268 relative to coupling 270. Further, the drive train unit 248 of the electric pump 138 includes a pumping arrangement 284 coupled to the coupling 270. The pumping arrangement 284 is adapted to drive or regulate a fluid flow in one or more fluid passages of the lock valve body 136, such as in the upright fluid passages 222. The pumping arrangement 284 includes a driver gear 272 and an idler gear 282.

The driver gear 272 is connected to the coupling 270, for example through a similar arrangement as the coupler key 269. Optionally, the driver gear 272 may be integrally formed with the coupling 270. The driver gear 272 includes oppositely and axially extending journal portions 276 and 278, with an end 280 of one of the journal portions (i.e. journal portion 278) being coupled to the coupling 270 and passing through the lip oil seal 265, as shown. The idler gear 282 is meshed with the driver gear 272 so as to rotate with a rotation of the driver gear 272, in turn defining the pumping arrangement 284. The pumping arrangement 284 is configured to impart a pumping action (envisioned by viewing direction H, H', FIG. 7) since a relative motion between the driver gear 272 and the idler gear 282 facilitates generation of a suction force to charge one side of a chamber of the electric pump 138 and a corresponding pressure side to force out the fluid, so as to pump and regulate a volume of fluid flow present within the fluid passages (such as the upright fluid passages 222) across the pumping arrangement 284. In that way, the drive train unit 248 is positioned and operably coupled to the one or more fluid passages (upright passages 222', 222") to work as a suction source or a pumping source to selectively regulate the fluid flow in the one or more fluid passages (for example, the upright passages 222', 222" and the connecting passages 218', 218", leading to the delivery ports 196', 196"). As shown in FIG. 7, the pumping arrangement 284 is arranged over the top face 206 of the lock valve body 136.

Each of the driveshaft 268, coupling 270, and the driver gear 272 are positioned and connected axially to each other such that a rotation of the driveshaft 268 may translate to a synchronously attained rotation of the driver gear 272. To this end, the drive train unit 248 is configured to be positioned through the guide bore 260 of the lock valve body 136. In some embodiments, it may be contemplated that the driveshaft 268 and the driver gear 272 are integrally formed, such as instituted by shaping, turning, and machining, a unitary base component. In still other embodiments, the pumping arrangement 284 or the driver gear 272 may be replaced by other known device, such as an impeller, that provide a pumping action, and a use of such devices (or a combination of such devices as customarily known) may fall within the ambit of the present disclosure.

The guide bore 260 includes a guide sleeve 271 that encapsulates the coupling 270 (section 7-7, FIG. 7). The guide sleeve 271 is positioned in the guide bore 260. The guide sleeve 271 is loosely located and radially held within the guide bore 260 via friction from an O-ring 273. The guide sleeve 271 is seated in an axial direction, along an elevation of the lock valve body 136, on a step 275 in the guide bore 260 and in proximity to the intermediate opening 263, as shown. The guide sleeve 271 has two functions—first, the guide sleeve 271 is adapted to guide an outer diameter (OD) of the coupling 270 when the driveshaft 268, the coupling 270, and the driver gear 272, are in motion; second, the guide sleeve 271 is adapted to retain the coupling 270 axially when the motor module (or the electric motor 246) is removed for insertion and assembly of the steering assembly 120 through the dashboard 152. To this end, the guide sleeve 271 includes a collar 277 that seats and/or limits the coupling 270's axial movement (direction, F, FIG. 7), were the driveshaft 268 being removed during disassembly. During disassembly of the motor module (or the electric motor 246) and/or other components, a loss of oil is prevented by the lip oil seal 265 (section 7-7, FIG. 7), which also enhances the ability to easily change the electric motor 246 and other components for service, repairs, upgrades, etc.

Additionally, the electric motor 246 is intended to be removable for initial installation as it is required for the steering assembly 120 to be inserted through an aperture (not shown) in the dashboard 152, and be fitted thereof. When the electric motor 246 is removed, the guide sleeve 271 and the coupling 270 is abstained from being disengaged, and any fluid leak, as may happen under the action of gravity through the guide bore 260, may be avoided because of a presence of the lip oil seal 265.

Furthermore, the lock valve body 136 includes a pump cap 286. The pump cap 286 is secured atop the lock valve body 136 so as to enclose the pumping arrangement 284. The pump cap 286 is secured to the top face 206, such as via one or more threaded fasteners 288. The pump cap 286 includes a shell shaped structure that is able to accommodate and guide another end 290 of the axially extending journal portion 276 of the driver gear 272 so as to ensure a wobble free, consistent operation of the driver gear 272. As with the driver gear 272, the pump cap 286 also includes an adjoining portion to accommodate an axially extended journal portion 292 of the idler gear 282, while an oppositely extended shaft portion 294 of the idler gear 282 is accommodated within an auxiliary guide bore 296 of the lock valve body 136.

The pump cap 286 includes at least twin fluid passages 298 (FIG. 10) that is able to alternatively deliver and receive fluid to/from the pumping arrangement 284. Said twin fluid passages 298 are also fluidly coupled to the upright fluid passages 222 by channels (not shown) so as to regulate fluid between the delivery ports 196', 196" via the second bore 210". The upright fluid passages 222, twin fluid passages 298, and the channels (not shown) form a generally singular fluid passage between the delivery ports 196', 196". Therefore, a regulation (i.e. a back and forth movement) of fluid between the first delivery port 196' and the second delivery port 196" is affected, facilitating the pumping arrangement 284 to communicate with the steering cylinder 124 (FIG. 2) and enable a movement of the piston-connecting rod arrangement 156 (FIG. 2) to eventually affect rudder movement and watercraft steering. In brevity, the drive train unit 248 is operably coupled to the twin fluid passages 298 via the pumping arrangement 284, and provides a pumping action to selectively affect regulation of the fluid flow in the one or more fluid passages (for example, the upright passages 222', 222" and the connecting passages 218', 218", leading to the delivery ports 196', 196"). The selective regulation of the fluid flow may occur in an absence of the input from the steering input device 130 or when the auxiliary drive assembly 134 operates in conjunction with the helm pump 132 (i.e. jog or power assist mode).

INDUSTRIAL APPLICABILITY

Referring to FIGS. 2, 3, and 4, as a general workflow of the steering circuit 122, a manipulation of the steering input device 130 along arrow, L, or along arrow, R, is configured to simultaneously cause reception and release of fluid from/ to the helm pump 132. More specifically, a fluid released from the helm pump 132 is first transferred to the lock valve body 136, which further transmits the released fluid to the steering cylinder 124. Such a transfer constitutes a first line of fluid operation and is facilitated by the first fluid line 144, as shown. As the steering cylinder 124 receives said fluid within a chamber (such as a first chamber) of the steering cylinder 124, the steering cylinder 124 is actuated in the direction represented by arrow, A, (FIG. 2) facilitating a release of fluid housed within an alternate chamber (second chamber) of the steering cylinder 124. The fluid released from the alternate chamber is routed to the lock valve body 136, and then eventually returned to the helm pump 132, representing the received fluid of the helm pump 132. This return of fluid defines a second line of fluid operation and is attained through the second fluid line 146. It is also possible that the first fluid line 144 and the second fluid line 146 sustain a reversal of the flow, such that the second fluid line 146 is subject to a fluid released from the helm pump 132 and which is advanced into the steering cylinder 124, while the first fluid line 144 is subject to a fluid receipt from the steering cylinder 124 and transferred to the helm pump 132 in a manner as will be apparent by analyzing the above working in reverse. By way of such a configuration, the steering system 102 assumes a closed circuit hydraulic system, as aforementioned. An actuation of the steering cylinder 124, thus attained, facilitates movement of the rudder 126 to which the steering cylinder 124 is operably connected, enabling watercraft steering.

Figure 9:
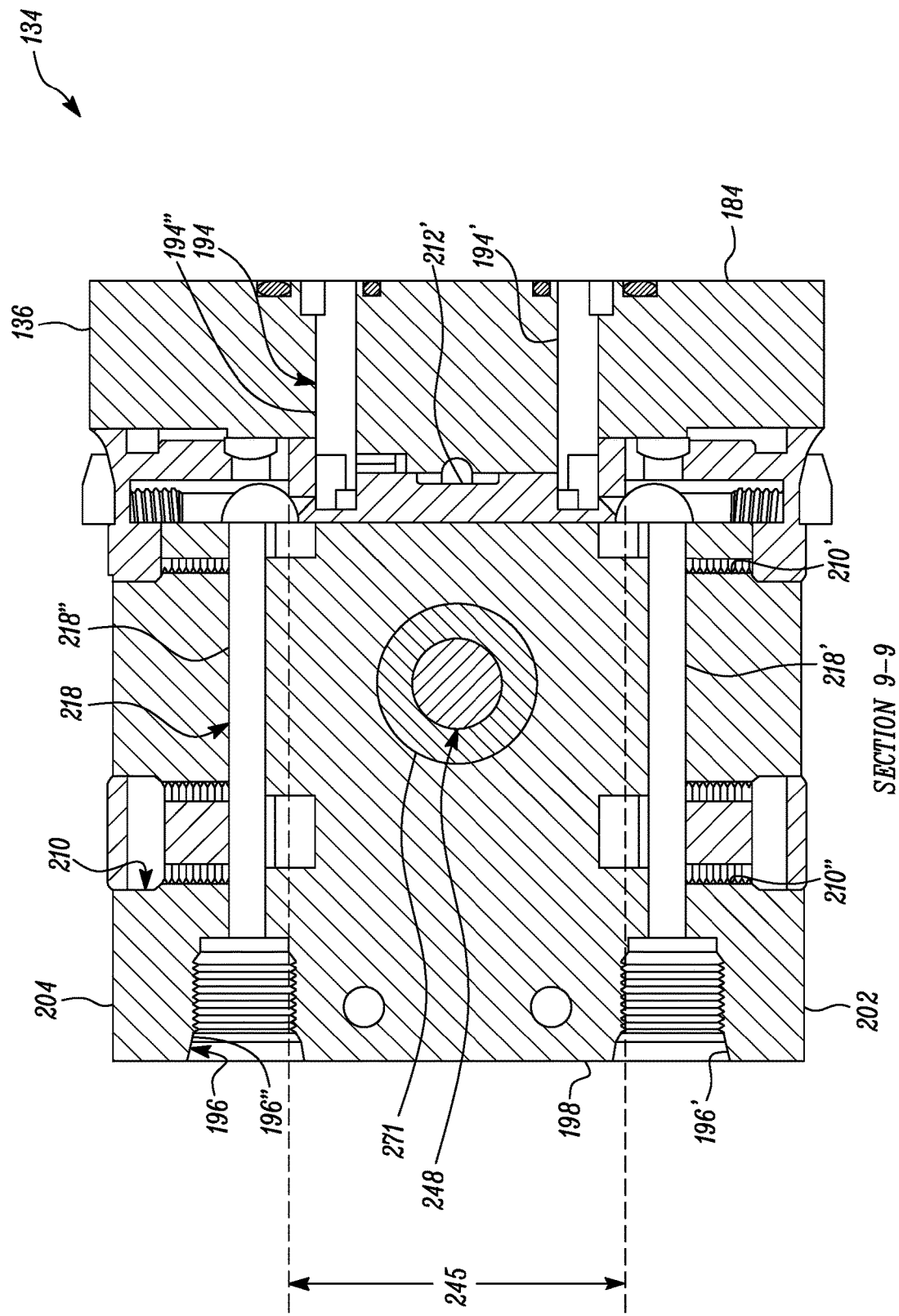

In a manual mode of operation, as an operator manipulates the steering input device 130, an input from the steering input device 130 is translated to the helm pump 132. The helm pump 132 pushes out the fluid into the lock valve body 136 via the transfer plate 176. Depending upon a direction of the manipulation (for example direction, R, FIG. 2), one of the input ports (for example, the first input port 194') receives fluid from the helm pump 132, while the other input port (second input port 194") facilitates a fluid return to the helm pump 132. For example, as the released fluid flows out of the helm pump 132 into the lock valve body 136 through the first input port 194', a pressure of the inflowing fluid may cause the first spool valve 212' to shift (or be unseated) from the default position by a compression of the second end 226" against the second ball 240" (see direction, D, FIG. 8), and allows the fluid to be released further into the first connecting passage 218' (FIG. 9). A general sequence of the shift includes an unseating of the ball 240', shifting of the first spool 213', and unseating of the ball 240". Given the movement of the first spool 213', an opening of the first input port 194' coincides with an opening of the second input port 194" as well. Therefore, fluid from the second input port 194" is also simultaneously routed back to the helm pump 132 via the second input port 194". Fluid released from the first input port 194' fills the first connecting passage 218' and proceeds towards the second bore 210". At this stage, fluid by-passes the second spool valve 212" stationed at the second bore 210" and flows out through the first delivery port 196' into the first fluid line 144. Effectively, if fluid is pushed out by the helm pump 132 by an input of the steering input device 130 from the first input port 194', fluid will be subsequently pushed out through the first delivery port 196', as well. Also, fluid will be received simultaneously into the second delivery port 196" and will be eventually received by the helm pump 132 via the second input port 194". A reverse flow of fluid will also be understood. In particular, if a fluid is being pushed out through the second input port 194" and the second delivery port 196", fluid will also be received simultaneously by the first delivery port 196' and first input port 194', to be subsequently delivered to the helm pump 132.

In an auto steer mode of operation or in a jog mode, an operator may occasionally leave the steering input device 130 inactive and may leave it to the electric pump 138 to automatically steer the watercraft 100. As a control commands (or a series of control commands that are pre-stored in the controller) are received, the electric motor 246 is configured to power an operation (or rotation) of the drive train unit 248, in turn causing the pumping arrangement 284 to build up a suction force in one of the twin fluid passages 298. Once a negative pressure has charged the twin fluid passages 298, the rotation of the electric pump 138 generates pressure to deliver the fluid to the one of the delivery ports 196', 196". In an example, a suction force generated in the first upright passage 222' would cause the fluid housed within the first upright passage 222' to be driven into a chamber of the pump cap 286, in which the pumping arrangement 284 is arranged, via one of the twin fluid passages 298, and thereafter is forced out from the second upright passage 222" (see arrows in FIG. 10). Such a pumping action affects fluid flow regulation. A resulting inflowing fluid entering the second bore 210" unseats the second spool valve 212" in a manner as has been discussed above for the first spool valve 212', so as to open the second bore 210" at both ends of the second spool valve 212". In that manner, fluid is eventually driven out via the second delivery port 196" into the second fluid line 146 to affect an actuation of the steering cylinder 124 and watercraft steering. A reversal of fluid flow in the auto steer mode is also possible.

It will be understood that during a manual mode of operation, the lock valve body 136 will function to restrict or disallow any amount of fluid to flow across (or back and forth between) the first upright passage 222' and the second upright passage 222", so as to avoid power loss when rudder swaying (and watercraft steering) is sought only by a manual steering process. Similarly, in an auto steer mode of operation, the first spool valve 212' remains stationary disallowing any communication of fluid between the helm pump 132 and the lock valve body 136. When the auxiliary drive assembly 134 in in operation; it is possible that the steering input device 130 will be operated too. Depending on the direction of input and the amount of fluid being pumped by the steering input device 130, additional fluid volume will be added or subtracted to the fluid volume being delivered by the auxiliary drive assembly 134.

In general, it will be understood that an integration of the electric pump 138 into the lock valve body 136, such as by having the forward nose portion 254 accommodated into the recess 252, an assembly of the steering system 102 is a rather effective way of assembling the two components, making the auxiliary drive assembly 134 more space efficient. Moreover, it will be understood that an integration of the electric pump 138 into the lock valve body 136 in a manner described above will also reduce fluid lines and conduits that otherwise are associated with conventional electric drives, had the electric motor 246 been positioned elsewhere, such as remotely to the lock valve body 136. Therefore, cost associated with procuring, assembly, and service, such as purging the conduits of air is mitigated. In an embodiment, the electric pump 138 may be entirely assembled into the recess 252 and thus an accommodation of the forward nose portion 254 of the electric pump 138 relative to the lock valve body 136 need not be seen as being restricted to the disclosed embodiments alone.

It will be appreciated that the foregoing description provides examples of the disclosed system and technique. However, it is contemplated that other implementations of the disclosure may differ in detail from the foregoing examples. Aspects of the present disclosure may also function in the absence of one or more components/features as have been disclosed. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. Therefore, one skilled in the art will appreciate that other aspects of the disclosure may be obtained from a study of the drawings, the disclosure, and the appended claim.

I claim:

1. A steering assembly for a hydraulic steering system, comprising:
    a steering input device including a helm pump; and
    an auxiliary drive assembly including:
        a lock valve body with one or more fluid passages that facilitate regulation of a fluid flow in response to an input from the steering input device, the lock valve body including a surface and a guide bore; and
        an electric pump including an electric motor with a drive train unit, the electric motor adapted to be mounted to the surface and the drive train unit adapted to be positioned through the guide bore and coupled to the one or more fluid passages so that the electric pump selectively regulate the fluid flow in the one or more fluid passages.

2. The steering assembly of claim 1, wherein the surface includes a recess structured in the lock valve body, and the electric motor being insertable into the recess to be mounted to the lock valve body.

3. The steering assembly of claim 1, wherein the lock valve body includes at least two input ports and at least two delivery ports, the one or more fluid passages being fluidly coupled to the at least two delivery ports.

4. The steering assembly of claim 1 wherein the helm pump is configured to be actuated by the steering input device to provide the input.

5. The steering assembly of claim 1, wherein the drive train unit of the electric pump includes a pumping arrangement to regulate the fluid flow in the one or more fluid passages.

6. The steering assembly of claim 5, wherein the pumping arrangement includes a driver gear and an idler gear, the driver gear being connected to the drive train unit and the idler gear being meshed with the driver gear to be driven by the driver gear.

7. The steering assembly of claim 6, wherein a relative motion between the driver gear and the idler gear imparts a pumping action, affecting regulation of the fluid flow in the one or more fluid passages.

8. The steering assembly of claim 5, wherein the lock valve body includes a pump cap configured to house the pumping arrangement.

9. An auxiliary drive assembly for a hydraulic steering system, comprising:
    a lock valve body with a recess and a guide bore, the lock valve body including:
        at least two input ports to receive a fluid as input;
        at least two delivery ports to deliver the fluid as output;

a fluid passage defined between the at least two delivery ports;

a first spool valve adapted to regulate a fluid flow from the at least two input ports to the at least two delivery ports; and an electric pump including an electric motor with a drive train unit, the electric motor adapted to be received into the recess and the drive train unit adapted to be positioned through the guide bore and coupled to the fluid passage so that the electric pump selectively regulates the fluid flow in the fluid passage.

10. The auxiliary drive assembly of claim 9 further comprising a second spool valve configured to regulate the fluid flow across the fluid passage between the at least two delivery ports in an absence of the fluid flow from the at least two input ports.

11. The auxiliary drive assembly of claim 9 further comprising a pumping arrangement configured to be positioned within the fluid passage to regulate the fluid flow between the at least two delivery ports.

12. The auxiliary drive assembly of claim 11, wherein the lock valve body includes a pump cap configured to house the pumping arrangement.

13. The auxiliary drive assembly of claim 11, wherein the pumping arrangement includes a driver gear and an idler gear, the driver gear being connected to the drive train unit, the idler gear being meshed with the driver gear to be driven by the driver gear.

14. The auxiliary drive assembly of claim 13, wherein a relative motion between the driver gear and the idler gear imparts a pumping action, affecting regulation of the fluid flow in the fluid passage, between the at least two delivery ports.

15. A watercraft, comprising:
a steering assembly including:
a steering input device; and
a helm pump adapted to be actuated by an input of the steering input device; and
an auxiliary drive assembly including:
a lock valve body fluidly coupled to the helm pump, the lock valve body including one or more fluid passages that facilitate regulation of a fluid flow in response to the input from the steering input device, the lock valve body including a surface and a guide bore; and
an electric pump including an electric motor with a drive train unit, the electric motor adapted to be mounted to the surface and the drive train unit adapted to be positioned through the guide bore and coupled to the one or more fluid passages so that the electric pump selectively regulate the fluid flow in the one or more fluid passages.

16. The watercraft of claim 15, wherein the surface includes a recess structured in the lock valve body, and the electric motor is insertable into the recess.

17. The watercraft of claim 15, wherein the drive train unit of the electric pump includes a pumping arrangement provided on the drive train unit to regulate the fluid flow in the one or more fluid passages.

18. The watercraft of claim 17, wherein the lock valve body includes a pump cap configured to house the pumping arrangement.

19. The watercraft of claim 17, wherein the pumping arrangement includes a driver gear and an idler gear, the driver gear being connected to the drive train unit and the idler gear being meshed with the driver gear to be driven by the driver gear.

20. The watercraft of claim 19, wherein a relative motion between the driver gear and the idler gear imparts a pumping action, affecting regulation of the fluid flow in the one or more fluid passages.

* * * * *

UNITED STATES PATENT AND TRADEMARK OFFICE
CERTIFICATE OF CORRECTION

PATENT NO. : 11,084,516 B2
APPLICATION NO. : 16/335696
DATED : August 10, 2021
INVENTOR(S) : David Thomas Shannon Page 1 of 1

It is certified that error appears in the above-identified patent and that said Letters Patent is hereby corrected as shown below:

In the Claims

Column 18, Lines 31-33, Claim 1, "coupled to the one or more fluid passages so that the electric pump selectively regulate the fluid flow in the one or more fluid passages." should be --coupled to the one or more fluid passages so that the electric pump selectively regulates the fluid flow in the one or more fluid passages.--.

Column 20, Lines 17-18, Claim 15, "electric pump selectively regulate the fluid flow in the one or more fluid passages." should be --electric pump selectively regulates the fluid flow in the one or more fluid passages.--.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*